United States Patent
Kugler et al.

[15] 3,637,193
[45] Jan. 25, 1972

[54] VENTILATOR-COOLING TOWER FOR COOLING GASES AND LIQUIDS

[72] Inventors: Manfred Kugler, Graz; Gerd Muller, Salzburg; Gunter Schwarz, Dornbirn, all of Austria

[73] Assignee: Fried. Krupp Gesellschaft mit beschrankter Haftung, Essen, Germany

[22] Filed: July 2, 1970

[21] Appl. No.: 52,044

[30] Foreign Application Priority Data

July 2, 1969 Austria..........................A 6311/69

[52] U.S. Cl. .........................261/24, 261/111, 261/DIG. 11, 52/63, 52/80, 52/83
[51] Int. Cl. ..........................................................B01f 3/04
[58] Field of Search ...................................261/24, 108–113, 261/DIG. 11; 52/63, 80, 83

[56] References Cited

UNITED STATES PATENTS

| | | | |
|---|---|---|---|
| 3,300,942 | 1/1967 | Horstman | 261/108 |
| 3,389,895 | 6/1968 | De Flon | 261/DIG. 11 |
| 3,461,626 | 8/1969 | Aitken | 52/80 |
| 3,546,826 | 12/1970 | Chapman | 52/80 |

*Primary Examiner*—Tim R. Miles
*Assistant Examiner*—Steven H. Markowitz
*Attorney*—Walter Becker

[57] ABSTRACT

A ventilator-cooling tower of the round type for cooling gases and liquids in which the supporting framework comprises a cable construction and in which the bearing means for the ventilator as well as a spacer ring within the region of the ventilator blades are firmly connected to a common shaft forming a supporting element of the cooling tower construction, the airtight envelope means for the cooling tower consisting of a material, such as reinforced synthetic material, impregnated canvas, wood, metal or asbestos cement, supported and anchored by the cable means.

9 Claims, 3 Drawing Figures

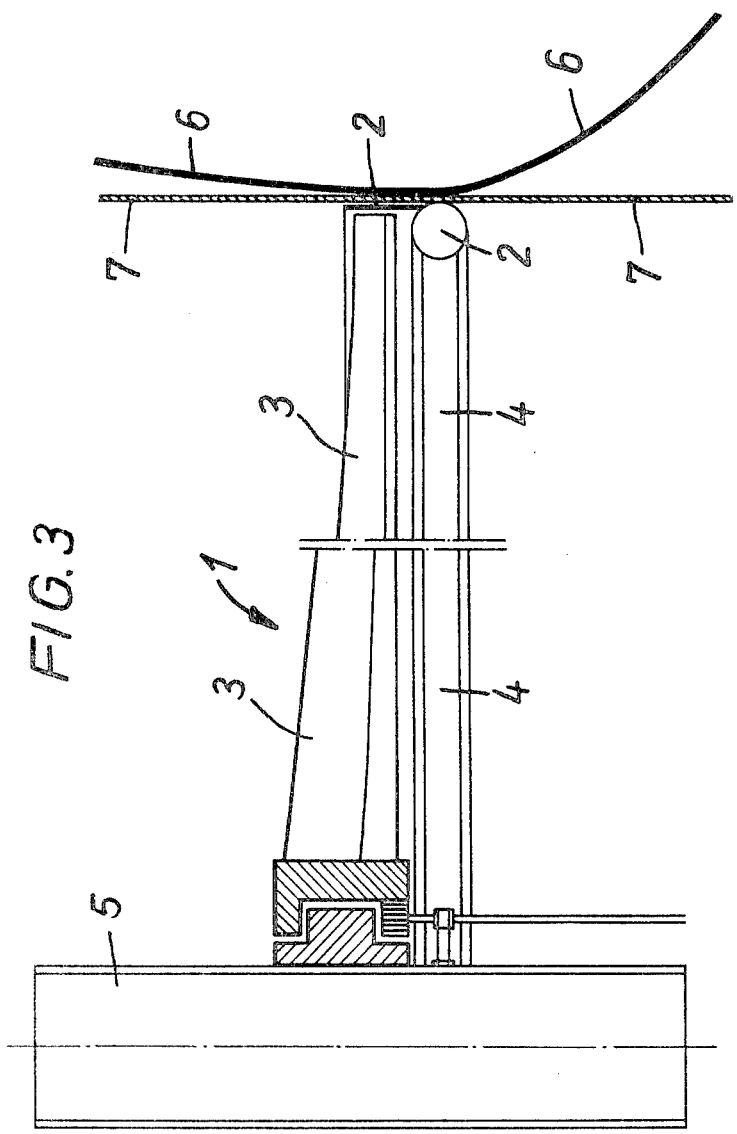

VENTILATOR-COOLING TOWER FOR COOLING GASES AND LIQUIDS

The present invention relates to a ventilator-cooling tower for cooling liquids and gases and, more specifically, concerns a round-cooling tower applying the countercurrent principle. A motor-driven ventilator or fan produces an artificial airflow in an airtight housing laid out in conformity with aerodynamic principles, which is employed for cooling liquids and gases. Warm liquids within the mantle of the cooling tower are pumped to a certain height, sprayed over distributing means including distributing pipes and spraying devices with spray dishes and are distributed over spray grate means which are located in a superimposed manner in a plurality of layers. In view of the frequency breaking up of the water droplets, the water surface and thus the heat exchange surface becomes very large so that the airstream passing through in countercurrent flow will absorb a considerable part of the heat energy of the liquid. The cooled liquid drops into a collecting tank therebelow. The liquid carried along by the airflow is separated by a drip catching device at the level of the distributing means and is regained.

During the cooling of gases, the gases pass through pipes which, in most instances, are provided with fins. Also liquids are cooled in pipes in conformity with this method.

The shape of the mantle of the ventilator-cooling tower of round construction depends on the flow technical conditions created by the artificial venting and also depends on structural features and generally comprises conical, cylindrical or hyperbolic shells or a combination thereof. The main supporting element of the cooling tower is the mantle shell which customarily consists of concrete, wood, or other suitable materials. A ventilator-cooling tower of concrete is produced section wise by means of rotatable forms while considerable material and time are required for this purpose.

Customarily, the ventilator or fan is mounted on a base which is not structurally connected to the mantle shell. Ventilator base and cooling tower mantle thus represent two-independent structural elements as a result of which the mantle shell may easily be subjected to oscillations which may result in visible deformations greatly affecting the stability of the mantle shell.

It is, therefore, an object of the present invention to provide a round ventilator-cooling tower for cooling gases and liquids which will overcome the above-mentioned drawbacks.

It is another object of the present invention to provide a cooling tower as set forth in the preceding paragraph, which can be mounted without forms so that the assembly time will be considerably reduced.

These and other objects and advantages of the invention will appear more clearly from the following specification in connection with the accompanying drawings, in which:

FIG. 1 diagrammatically illustrates a vertical section through a cooling tower according to the invention.

FIG. 3 illustrates details within the region of the ventilator or fan.

Figure 1:
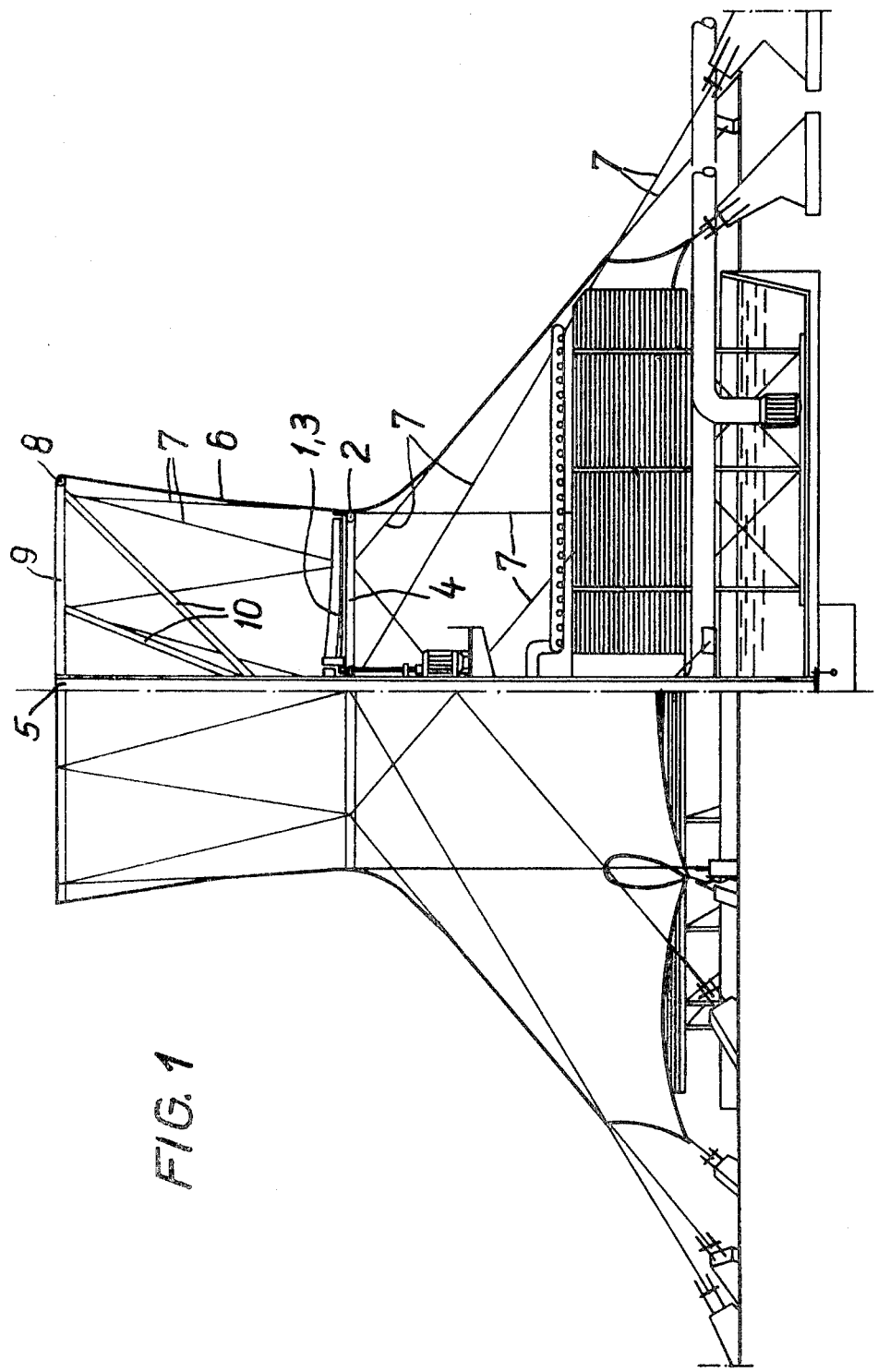
Figure 2:
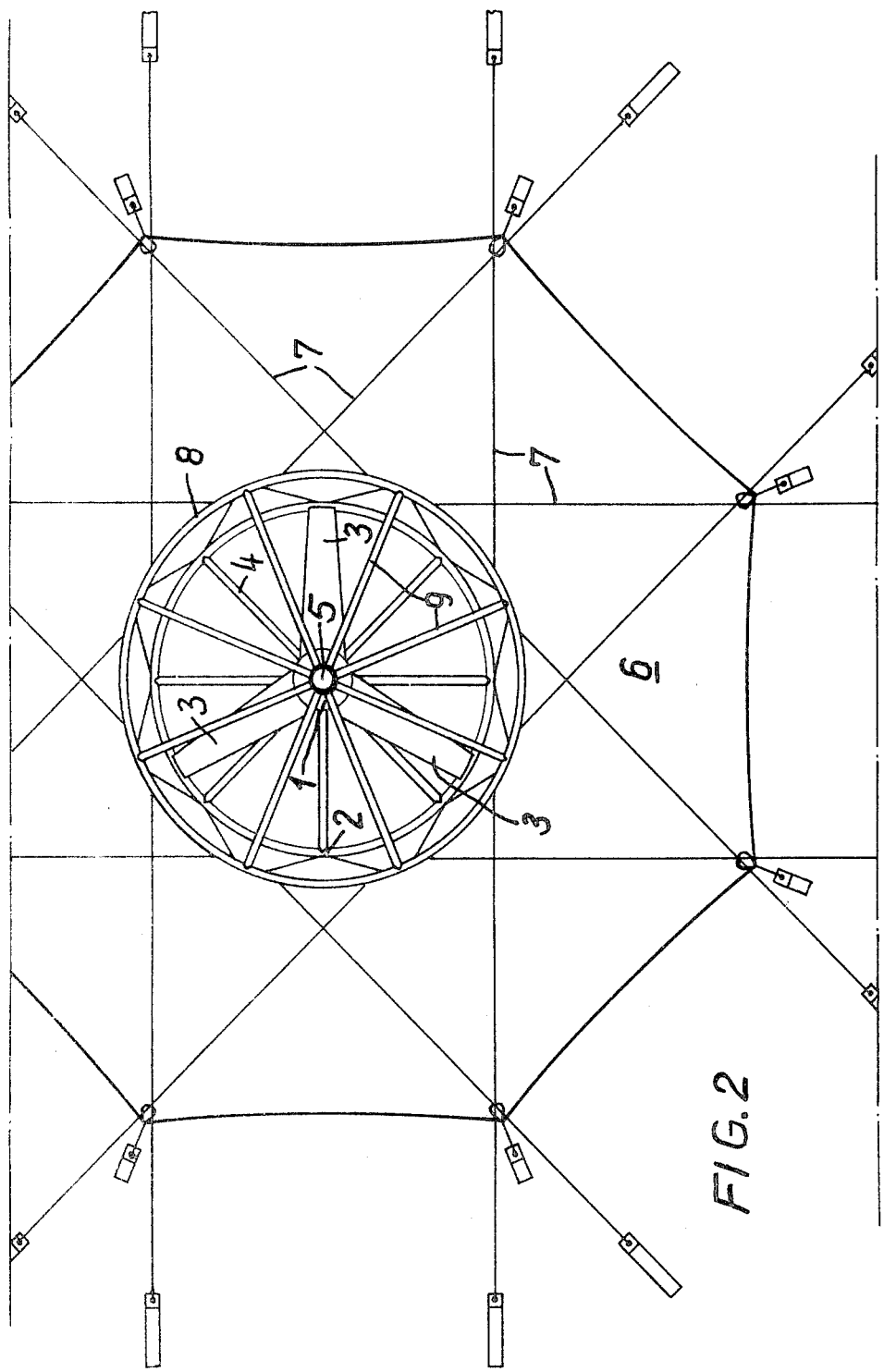
FIG. 2 is a top view of FIG. 1.

The ventilator-cooling tower according to the present invention is characterized primarily in that the supporting framework comprises a cable construction and that the mounting of the ventilator or fan which draws in the cooling air as well as the spacer ring within the region of the ventilator blades are fixedly connected by means of spokes or arms to a common shaft which simultaneously represents a supporting element of the cooling tower construction. The ventilator-cooling tower according to the present invention is furthermore characterized in that the airtight housing of the cooling tower consists of a material which is suitable to be held by a cable construction, for instance, or reinforced synthetic material or impregnated canvas, wood, metal or asbestos cement.

Referring now more specifically to the drawings, in contrast to heretofore known designs of the type involved, spoked rings 2,8 are fastened to a supporting central shaft or column 5 resting on a foundation 20. These rings 2,8 serve for holding or guiding a cable construction. Each two cables 7 which cross each other in the plane of the lower spoked ring 2 are by means of a clamp 30 (FIG. 3) fixedly connected to each other at their second-crossing point 28. When determining said second crossing point, the expansion of the cables due to the preload acting thereupon is to be taken into consideration. Two cable pairs diametrically crossing each other are simultaneously pretensioned so that the spoked rings 2,8 and central shaft 5 remain free from bending moments. When the desired pretension has been realized, the clamps 30 of the intercrossing cables are fixed at the lower spoked rings 2. The mantle or housing 6 is made of a material which is strong enough to be held by a pretensioned cable construction, and may for instance, be of reinforced synthetic material, impregnated canvas, wood, metal or asbestos cement.

The connection and tying down of the cables to the foundation blocks 21, is effected by means of turnbuckles 23. After the cables including the main cables 7 have been pretensioned, the central column 5 is secured in its vertical position and the entire system is stabilized.

The central shaft 5 which carries the cooling tower simultaneously carries the ventilator 1. The envelope or mantle 6 is held in spaced relationship to the ventilator blades 3 by a spoke-equipped or spacer ring 2 located within the region of the ventilator 1. This design will assure that vertical pendulumlike oscillations of the mantle or envelope 6 and of the ventilator 1 can occur only synchronously so that the ventilator blades 3 cannot hit the envelope or mantle 6. The bracing of the spokes 4,9 of the rings 2,8 with regard to the central shaft 5 prevents oscillations of the rings 2,8 in the planes of the rings.

The vertical components occuring due to the pretensioning of the cable means are by the spoked rings conveyed through the struts 10 into the central shaft 5. Cable and other metal parts are provided with a protection against corrosion.

The advantages of the new construction are seen primarily in that the assembly is effected without forms so that the assembly time is reduced to a minimum and the weight of the structure is likewise considerably reduced which means that also the production costs are considerably reduced. The structure is easily disassembled, and the customarily employed base for the ventilator is saved. In view of the synchronism of the oscillations of the ventilator 1 and the cooling tower mantle 6, the gap between the ventilator blades 3 and the cooling tower mantle 6 can be extremely narrow which fact greatly increased the degree of efficiency of the cooling tower. The spokes 4,9 prevent bending oscillations of the rings 2,8 in the circular planes.

It is, of course, to be understood that the present invention is, by no means, limited to the particular showing in the drawings, but also comprises any modifications within the scope of the appended claims.

What we claim is:

1. A ventilator-cooling tower of the round type for cooling gases and liquids, which includes: central shaft means forming a supporting member of said cooling tower, ventilator means comprising ventilator blades, bearing means journalling said ventilator means and supported by said shaft means, spacer ring means extending around said ventilator means and connected to said shaft means, said spacer ring means having outer annular means, substantially airtight envelope means extending around said spacer ring means and being connected thereto, and cable means connected to and supporting said envelope means.

2. A cooling tower according to claim 1, in which said spacer ring means has said outer annular means braced with regard to said shaft means by means of spokes.

3. A cooling tower according to claim 1, in which said envelope means consists of a material selected from the group consisting of canvas material, reinforced synthetic material, wood, metal and asbestos cement.

4. A cooling tower according to claim 1, in which said airtight envelope means has a conical contour.

5. A cooling tower according to claim 1, in which said airtight envelope means has a cylindrical contour.

6. A cooling tower according to claim 1, in which said airtight envelope means has a hyperbolic contour.

7. A cooling tower according to claim 1, in which said airtight envelope means is substantially weather and light resistant and also resistant against industrial waste gases.

A cooling tower according to claim 1, which includes secondary cable support means for additionally stabilizing the cooling tower.

9. A cooling tower according to claim 1, in which said spacer ring means includes a first ring member in the region of said ventilator blades and also includes a second ring member defining the exit opening of said airtight envelope means.

* * * * *